INVENTOR:
J. E. RICHARDSON
BY:
HIS ATTORNEY

United States Patent Office 3,336,476
Patented Aug. 15, 1967

3,336,476
DETECTING RADIOACTIVE POTASSIUM IN THE PRESENCE OF URANIUM AND THORIUM
Jasper E. Richardson, Houston, Tex., assignor to Shell Oil Company, New York, N.Y., a corporation of Delaware
Filed Oct. 25, 1963, Ser. No. 319,034
8 Claims. (Cl. 250—71.5)

This invention relates to a method of radioactive logging to determine the presence and amounts of potassium in an earth formation penetrated by a borehole. More particularly, this invention relates to a method of producing a log of the potassium present in an earth formation containing unknown quantities of uranium and thorium by the utilization of detected natural gamma radiations.

It is known that the three principle sources of natural gamma radioactivity freely found in earth formations are potassium 40, uranium 238 and thorium 232. In about 11% of its disintegrations, potassium 40 decays, by electron capture, to argon 40. Each argon 40 nucleus is left excited and goes to its ground state with the emission of a 1.47 mev. gamma ray. Uranium 238 is the parent of a radioactive series which emits a spectrum of gamma rays extending up to 2.40 mev. Thorium 232 is the parent of another radioactive series which emits a spectrum of gamma rays extending up to 2.62 mev. Although the associated gamma rays are not emitted directly from either of the three sources, they are generally identified as belonging to these respective sources.

When logging an earth formation penetrated by a borehole to determine the quantity of potassium present by means of natural gamma radiations, care must be taken to distinguish between the natural gamma radiations associated with potassium and those associated with uranium and thorium. The degree of distinction required will depend upon the relative abundances of the sources.

One method of determining the quantity of potassium in an earth formation is by means of a conventional gamma-ray log of the natural radioactivity. Such a log can be produced by detecting the natural gamma radiations in a borehole by means of a scintillation detector consisting of a scintillation crystal and a photomultiplier; passing the output pulses from the photomultiplier to a pulse height discriminator which passes only pulses corresponding to radiation energy above a preselected value; integrating the output pulses from the discriminator and recording the integrated signal as an indication of the number of detected gamma rays per unit of time, i.e., counts per minute (c.p.m.). Since the gamma-ray log indicates the counting rate for the total gamma radiations in the earth formation without differentiating as to the source of the radiations, it can only be used to detect concentrations of potassium under certain very limited conditions. For example, with a thallium activated sodium iodide scintillation crystal two inches in diameter and two inches long, and with a discriminator bias of about 0.3 mev., the following approximate counting rates from the three contributating sources of natural radiation would result:

| Source of radiation: | C.p.m. for pulses above 0.3 mev. |
|---|---|
| 1% K | 400 |
| 1 p.p.m. U | 350 |
| 1 p.p.m. Th | 180 |

As can be seen from the above table, it would be impossible with these concentrations to distinguish the radiations due to potassium in a conventional gamma-ray log. If, however, it were known, e.g. from other type logs, that the concentrations of uranium and thorium were not greater than a few p.p.m., it would then be possible to obtain a reasonably accurate log showing large concentrations of potassium, for example, greater than 20%. If, on the other hand, no information as to the uranium concentrations is available or if the uranium and thorium concentrations are large, the conventional gamma-ray log would be useless.

A more reliable method of producing a potassium log, utilizing the natural radioactivity of potassium 40, would be to use the scintillation detector as a gamma-ray spectrometer. A scintillation spectrometer delivers an output signal which depends upon the manner in which a gamma ray interacted with the crystal. In some instances, a gamma ray is scattered in the crystal and loses some fraction of its energy. In other instances, a gamma ray is totally absorbed in the crystal and loses all of its energy. Consequently, for a succession of gamma rays all of the same energy, the recorded pulse-height distribution is a continuum of pulses produced by Compton scattering and a relatively narrow peak produced by total absorption. The pulse height corresponding to the center of the peak is proportional to the gamma-ray energy. The width of the peak depends upon the resolution of the spectrometer. Using pulse amplitudes calibrated to an energy scale, the center of the potassium 40 peak will correspond to an energy of 1.47 mev. and the entire peak will correspond to energies between about 1.25 mev. and 1.7 mev. In a well known manner, one could adjust an electronic channel so as to pass only pulses between 1.25 mev. and 1.7 mev. where signals due to potassium gamma rays are most prevalent. This method provides improved discrimination between the counting rates from potassium and those from uranium and thorium as shown in the following table:

| Source of radiation: | C.p.m. for pulses between 1.25 and 1.7 mev. |
|---|---|
| 1% K | 105 |
| 1 p.p.m. U | 23 |
| 1 p.p.m. Th | 5 |

As can be seen from the table, when using this method, the relative sensitivity to uranium and thorium is greatly reduced. However, even with this improvement, the method is still sensitive to uranium and thorium and would produce erroneous indications unless the uranium and thorium were present only in minor quantities.

It is therefore a primary object of this invention to provide an improved method of determining the presence and amount of potassium in an earth formation by utilizing the natural radioactivity of potassium 40.

It is a further object of this invention to provide a method of determining the presence and amount of potassium in an earth formation by utilizing the natural gamma radiation of potassium 40 regardless of the amounts of uranium and thorium present in the formation.

Briefly, the above objects are attained by detecting the natural gamma radiations emanating from the earth formation by means of a scintillation detector; generating a pair of electrical signals, one of which is proportional to the counting rate of the detected radiation within a predetermined pulse-height range wherein pulses due to potassium are found, and the other of which is proportional to the counting rate of the detected radiation within the predetermined pulse-height range due to radiations from uranium and thorium; and, then recording a signal equal to the difference between the generated pair of signals as an indication of the concentrations of potassium present.

The objects and advantages of the invention will be more easily understood from the following detailed description of the invention taken in conjunction with the attached drawings, wherein.

Figure 1A:
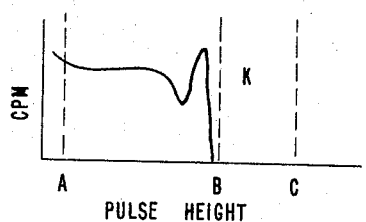
FIGURES 1A, 1B and 1C are charts showing the response of a scintillation spectrometer to the respective gamma rays associated with potassium, uranium and thorium.
Figure 1B:
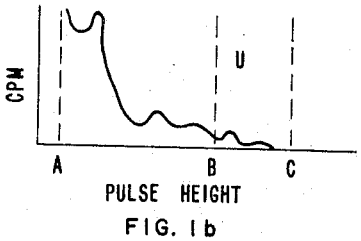
Figure 1C:
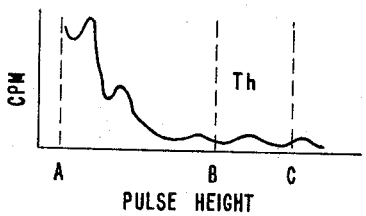

Refering now to FIGURES 1A–1C, the gamma-ray, pulse-height distributions of potassium, uranium and thorium are shown in terms of counting rate (c.p.m.) versus relative pulse height (mev.). The respective curves are indicative of the response of the scintillation type radiation detector used in carrying out the method according to the invention to each of the three radioactive elements. In order to make the potassium log according to the invention as accurate as possible, the shapes of the respective curves are preferably determined under average borehole conditions. However, it should be noted that even if the respective curves are not determined under borehole conditions, the method according to the invention will still result in a more accurate log of potassium than has been previously possible in areas where uranium and thorium concentrations are large.

As previously pointed out, since the output of the radiation detector is a composite of signals from potassium, uranium and thorium, the signals due to radiation from uranum and thorium must be eliminated from the composite signal in order to accurately determine the presence and concentration of potassium. This can be accomplished by subtracting the signals due to uranium and thorium from the total or conventional gamma ray signal which is represented by the energy range A–C. Since, however, the concentrations of uranium and thorium are also unknown, a signal proportional to the uranium and thorium radiations must be generated from the total detected gamma radiation signal.

As can be seen from the three pulse-height distribution curves, pulses due to potassium occur in a more limited energy range than the pulses from either uranium or thorium. Therefore, by proper pulse-height discrimination, a signal proportional to only the pulses in the energy range in which pulses due to potassium radiation do not occur, i.e., B–C may be generated. This generated signal, through proper adjustment of the energy ranges AB and BC, may be used as a measure of the uranium and thorium present in the formation. The proper adjustment can be accomplished by selecting a value B which is above the largest signal produced by a potassium gamma ray, and then adjusting the values A and C so that the ratio of radiation pulses in the energy range A–C to those in the energy range B–C is the same for both uranium and thorium. Once the energy ranges have been predetermined in this manner, the counting rate of any radiation detected in the energy range B–C will be proportional to the counting rate due to the total radiations from uranium and throium in the energy range A–C.

The value of point B is preferably selected above that value of energy corresponding to the largest pulse amplitude due to a potassium gamma ray, i.e., about 1.6 mev. With this selected value for B, it has been found that values of A and C corresponding to 0.3 mev. and 2.4 mev., respectively, will result in the proper ratio of pulses. For example, with the same scintillation type radiation detector as used in the above examples for other methods of detecting potassium, the following sensitivities would result:

| Source | B–C, c.p.m. | A–C, c.p.m. |
|---|---|---|
| 1% K | 0 | 400 |
| 1 p.p.m. U | 35 | 350 |
| 1 p.p.m. Th | 18 | 180 |

From the above table, it can be seen that the ratio of the number of gamma ray pulses falling within energy range A–C to those falling within energy range B–C is the same for both uranium and thorium, i.e., 10:1. The difference between a signal proportional to the counting rate of the detected radiation in the energy range A–C and a signal proportional to the counting rate of the detected radiation in the energy range BC, after the relative amplitudes of the two signals have been adjusted to compensate for the predetermined ratio factor, e.g., by dividing the A–C energy range signal or multiplying the B–C energy range signal by the ratio factor, is then an indication of only the counting rate of radiation due to potassium.

Figure 2:
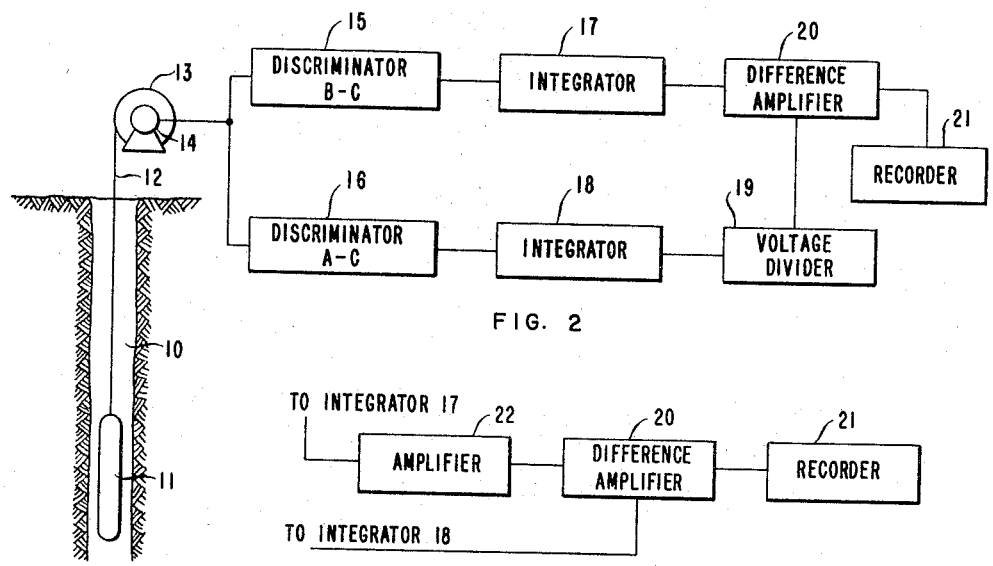
FIGURE 2 is a schematic representation of the apparatus which may be used in performing the method of the invention.

Referring now to FIGURE 2, there is shown a preferred apparatus for carrying out the method as explained above. Within a borehole 10, there is shown a scintillation type radiation detector 11 consisting of a crystal of suitable scintillation material, preferably thallium activated sodium iodide, and a photomultiplier which detects the total natural gamma radiation emitted by any potassium, uranium, or thorium found in the adjacent earth formation. The electrical pulse signals produced by radiation detector 11 are transmitted to the surface by means of an electrical cable 12 which also supports the detector 11. The cable 12 is raised and lowered by a pulley member 13 which may be driven by any suitable driving means (not shown). The cable 12 is connected via slip ring arrangement 14, and if desired an amplifier (not shown), to a pair of pulse heigh discriminators 15, 16. The discriminator 15 is biased to pass only pulses corresponding to gamma ray energies between B and C whereas discriminator 16 is biased to pass only pulses corresponding to gamma ray energies between A and C. The output of the discriminator 15 is connected to an integrating circuit 17 which integrates the pulses passed by the discriminator 15 to produce a signal proportional in amplitude to the counting rate of the detected radiation falling within the energy range B–C and thus proportional to the radiation due to urinium and thorium.

The output signal from the discriminator 16 is passed via an integrating circuit 18 to an adjustable voltage divider 19, which attenuates the signal from the integrator 18 by a factor equal to the ratio of the pulses falling within the energy range A–C to those falling within energy range B–C as predetermined from the three natural gamma radiation curves of FIGURE 1.

The outputs of the integrator 17 and voltage divider 19 are connected to respective inputs of a difference amplifier 20, which has its output connected to a recorder 21. The recorder 21 is preferably of the type having a moving chart which is driven through an appropriate gearing arrangement (not shown) by the driving means for the pulley member 13 in order that the location of the radiation detector 11 in the borehole 10 may be correlated with the recorded signal.

Since the output signal from the integrator 17 is equal to the portion of the output signal from voltage divider 19 due to uranium and thorium, the output signal from the difference amplifier 20 is proportional only to detected radiation due to potassium and hence may be directly recorded on the chart of the moving chart recorder as a log of the potassium present in the various earth strata traversed by the borehole 10.

Figure 3:
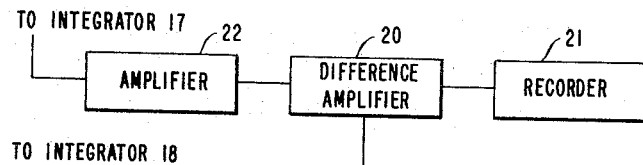
FIGURE 3 is a schematic representation of a modification of the apparatus of FIGURE 2 which may be used in carrying out the method of the invention.

Referring now to FIGURE 3, there is shown a modification of the apparatus of FIGURE 2 for carrying out the method in a slightly different manner. In this embodiment of the invention, the output from the integrator 18 is connected directly to one input of the difference amplifier 20 while the output signal from the integrator 17 is passed via an amplifier 22 having an adjustable gain, to the second input of the difference amplifier 20. The gain of the amplifier 22 is adjusted to multiply the signal from integrator 17 by the same factor that the voltage divider 19 attenuated the output signal of integrator 18 in FIGURE 2, i.e., the ratio of the pulses falling within the energy range A–C to those falling within energy range B–C as predetermined from the three natural gamma radiation curves of FIGURE 1. Since the output signal from the amplifier 22 is now equal to the portion of the output signal from the integrator 18 due to uranium and thorium, the output from the difference amplifier may again be directly recorded on the chart of recorder 21 as a log of the potassium present in the earth strata traversed by the borehole 10.

Obviously, various modifications of the present invention may be made without departing from the spirit and scope of the teachings. Therefore, only such limitations as are indicated in the appended claims should be imposed.

I claim as my invention:

1. The method of indicating the presence of radioactive potassium in an earth formation which may contain deposits of uranium and thorium comprising:
   (a) detecting the natural gamma-ray emissions from said formation by means of a scintillation detector;
   (b) generating a first signal proportional to the counting rate of the detected radiation within a predetermined energy range;
   (c) generating a second signal proportional to the counting rate of the detected radiation within a portion of said predetermined energy range within which the counting rate is substantially exclusively due to radiation from uranium and thorium;
   (d) producing a signal proportional to the difference between said first and second signals; and,
   (e) recording said difference signal.

2. The method of indicating the presence of radioactive potassium in an earth formation which may also contain uranium and thorium comprising:
   (a) detecting the total gamma-ray emission from said formation by means of a scintillation detector;
   (b) simultaneously filtering the output pulses from said scintillation detector to produce a first train of pulses containing only those pulses in the scintillation detector output signal corresponding to pulse amplitudes between a first and a second predetermined value and a second train of pulses containing only those pulses in the scintillation detector output corresponding to pulse amplitudes between said second a third predetermined value, said first and second values being respectively below and above the values of pulse amplitudes corresponding to values at which those produced by potassium radiation are most prevalent, and said third predetermined value being greater than the highest pulse amplitude due to potassium but less than said second predetermined value, said first and second values being selected such that the ratio of pulses falling between said second and third predetermined value to those falling between said first and second predetermined values is the same for both uranium and thorium;
   (c) separately integrating each of said first and second trains of pulses to produce respective first and second integrated signals;
   (d) adjusting the relative amplitudes of said first and second integrated output signals so that the amplitude of said second integrated output signal is equal to the proportion of the amplitude of said first integrated output signal due to uranium and thorium;
   (e) producing a signal proportional to the difference between said relatively adjusted first and second integrated signals; and,
   (f) recording said difference signal as an indication of the potassium present in the formation.

3. The method of claim 2 wherein said first, second and third predetermined values correspond to gamma-ray energies of 0.3, 2.4 and 1.6 mev., respectively.

4. The method of claim 2 wherein said step of adjusting the relative amplitudes of said first and second integrated signals comprises: attenuating said first integrated signal by a factor equal to said ratio.

5. The method of claim 2 wherein said step of adjusting the relative amplitudes of said first and second integrated signals comprises: multiplying said second integrated signal by a factor equal to said ratio.

6. The method of logging an earth formation, traversed by a borehole, to produce a log of potassium contained therein comprising:
   (a) passing a scintillation detector through said borehole to detect the gamma-ray emission of the formation due to natural radio-activity;
   (b) producing a first electrical signal corresponding to the detected gamma radiation within a first predetermined pulse amplitude range;
   (c) simultaneously producing a second electrical signal corresponding to the detected gamma radiation within a second predetermined pulse amplitude range, said second preselected pulse amplitude range being included within said first preselected pulse amplitude range and above the highest pulse amplitude produced by gamma radiation from potassium, said first and second pulse amplitude ranges being selected such that the ratio of the detected gamma radiation in said first preselected pulse amplitude range due to any uranium or thorium which might be present in the earth formation, to the detected gamma radiation in said second predetermined pulse amplitude range due to uranium and thorium, is the same for both uranium and thorium;
   (d) integrating said first electrical signal;
   (e) integrating said second electrical signal;
   (f) attenuating said first integrated electrical signal by a factor equal to said ratio;
   (g) producing a signal proportional to the difference between said attenuated first integrated signal and said second integrated signal; and,
   (h) recording said difference signal.

7. Method of claim 6 wherein said first predetermined pulse amplitude range corresponds to gamma-ray energies between 0.3 and 2.4 mev. and said second preselected pulse amplitude range corresponds to gamma-ray energies between 1.6 and 2.4 mev.

8. The method of logging an earth formation, traversed by a borehole, to produce a log of potassium contained therein comprising:
   (a) passing a scintillation detector through said borehole to detect the gamma-ray emission of the formation due to natural radio-activity;
   (b) producing a first electrical signal corresponding to the detected gamma radiation within a first predetermined pulse amplitude range;
   (c) simultaneously producing a second electrical signal corresponding to the detected gamma radiation within a second predetermined pulse amplitude range, said second preselected pulse amplitude range being included within said first preselected pulse amplitude range and above the highest pulse amplitude produced by gamma radiation from potassium;
   (d) integrating said first electrical signal;
   (e) integrating said second electrical signal;
   (f) attenuating said first integrated electrical signal by a factor equal to the ratio of the detected gamma radiation in said first predetermined pulse amplitude range due to uranium and thorium to the detected gamma radiation in said second predetermined pulse amplitude range due to uranium and thorium as determined under average borehole conditions;

(g) producing a signal proportional to the difference between said attenuated first integrated signal and said second integrated signal; and, (h) recording said difference signal.

References Cited

UNITED STATES PATENTS

| | | | |
|---|---|---|---|
| 2,469,460 | 5/1949 | Fearon | 250—83.6 |
| 2,892,091 | 6/1959 | Sawle | 250—71.5 |
| 3,105,149 | 9/1963 | Guitton et al. | 250—71.5 |

ARCHIE R. BORCHELT, *Primary Examiner.*